United States Patent
Salter et al.

(10) Patent No.: US 12,096,115 B2
(45) Date of Patent: Sep. 17, 2024

(54) VEHICLE OPERATIVE AS A PHOTOGRAPHY ASSISTANT

(71) Applicant: Ford Global Technologies, LLC, Dearborn, MI (US)

(72) Inventors: Stuart C. Salter, White Lake, MI (US); David Kennedy, Canton, MI (US); Pietro Buttolo, Dearborn Heights, MI (US); Jeff Seaman, Brownstown, MI (US); Annette Huebner, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 367 days.

(21) Appl. No.: 17/652,399

(22) Filed: Feb. 24, 2022

(65) Prior Publication Data
US 2023/0269463 A1   Aug. 24, 2023

(51) Int. Cl.
*H04N 23/66* (2023.01)
*B60W 60/00* (2020.01)
*H04N 23/60* (2023.01)

(52) U.S. Cl.
CPC ........ *H04N 23/66* (2023.01); *B60W 60/0025* (2020.02); *H04N 23/64* (2023.01); *B60W 2420/403* (2013.01)

(58) Field of Classification Search
CPC ... H04N 23/66; H04N 23/64; B60W 60/0025; B60W 2420/403; B62D 15/0285; B60R 1/22
(Continued)

(56) References Cited

U.S. PATENT DOCUMENTS 9,523,984 B1\* 12/2016 Herbach ............... B60W 10/18
2019/0011910 A1\* 1/2019 Lockwood ............ G08G 1/164

FOREIGN PATENT DOCUMENTS

CN    204559720 U    8/2015
CN    107071359 A    8/2017
(Continued)

OTHER PUBLICATIONS

Stenquist, Paul, The Future of Car Navigation as Arrived, https//www.nytimes.com/2021/02/25/business/GPS-car-Systems.html, Feb. 25, 2021, 1-4.

*Primary Examiner* — Muhammad Shafi
(74) *Attorney, Agent, or Firm* — Emily Drake; Eversheds Sutherland (US) LLP

(57) ABSTRACT

The disclosure is generally directed to systems and methods associated with a vehicle that is configured to provide photography assistance. An example method executed by processor of a vehicle may include generating a guidance associated with a photo capture operation and conveying the guidance to a vehicle controller. The processor may assist the vehicle controller to execute a vehicle maneuvering operation to capture a photograph of an object of photographical interest located outside the vehicle. The vehicle maneuvering operation can include parking the vehicle at a location that provides a view of the object or slowing down the vehicle while driving past the location. The photo capture operation can include the processor determining that the object is in a field of view of a camera mounted on the vehicle, configuring the camera to capture a photograph of the object, and operating the camera to capture the photograph of the object.

13 Claims, 6 Drawing Sheets

(58) Field of Classification Search
USPC .......................................................... 701/28
See application file for complete search history.

(56) References Cited

FOREIGN PATENT DOCUMENTS

| CN | 212906264 U | 4/2021 |
|---|---|---|
| JP | 2010266410 A | 11/2010 |

* cited by examiner

VEHICLE OPERATIVE AS A PHOTOGRAPHY ASSISTANT

BACKGROUND

Capturing a photograph of an object located outside a moving vehicle can be quite challenging, especially when one is unprepared for taking the photograph and/or is unaware of an upcoming opportunity to do so. It is therefore desirable to address such shortcomings associated with photography.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
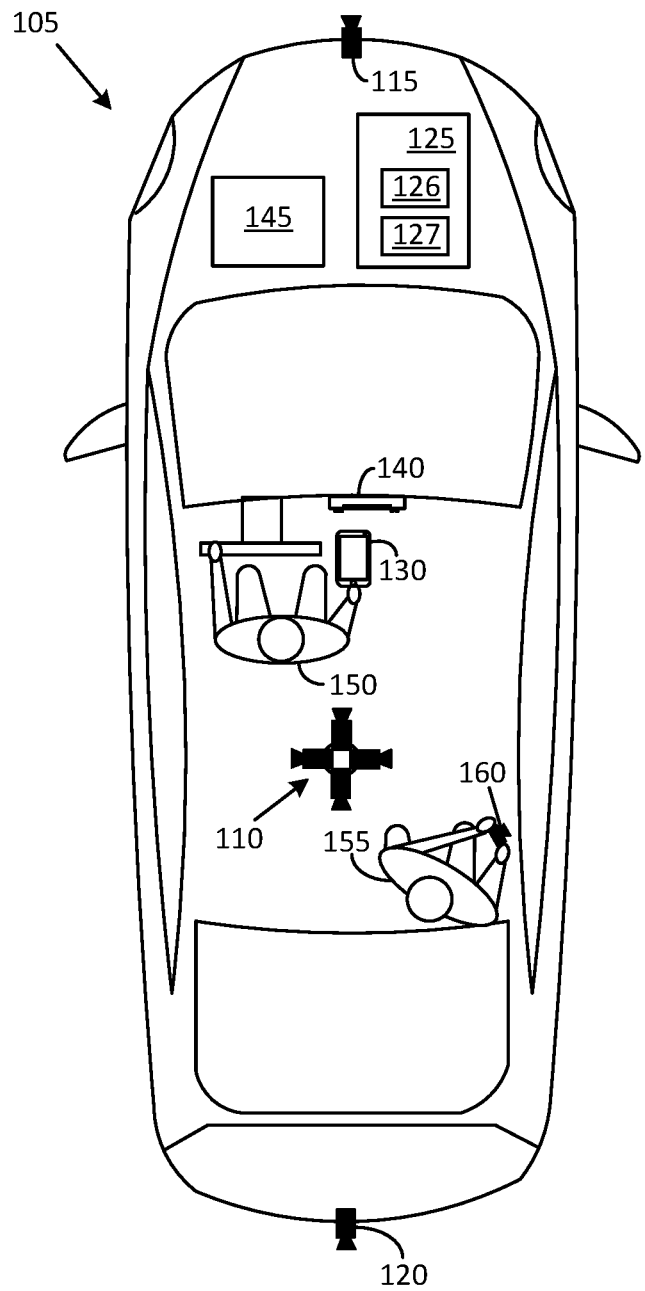
FIG. 1 shows an example vehicle that includes a photography assistance system in accordance with an embodiment of the disclosure.

In terms of a general overview, embodiments described in this disclosure are generally directed to systems and methods associated with a vehicle that is configured to provide photography assistance. An example method executed by processor of a vehicle may include generating a guidance associated with a photo capture operation and conveying the guidance to a vehicle controller and/or an occupant of the vehicle. The processor may then assist the vehicle controller and/or a driver of the vehicle to execute a vehicle maneuvering operation to capture a photograph of an object of photographical interest located outside the vehicle. In one case, the vehicle maneuvering operation involves parking the vehicle at a location that provides a view of the object of photographical interest located outside the vehicle or slowing down the vehicle while driving past the location that provides the view of the object of photographical interest. In one case, the photo capture operation can include the processor determining that the object is in a field of view of a camera mounted on the vehicle, configuring the camera to capture a photograph of the object of photographical interest, and operating the camera to capture the photograph of the object of photographical interest.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, it must be understood that the word "object" as used herein with respect to photographs encompasses various man-made objects (buildings, statues, structures, etc.), natural objects (trees, mountains, waterfalls, rivers, animals, birds, etc.), and scenery (sunset, sunrise, etc.). The word "photo" as used herein encompasses any of various forms of images (still photographs, video clips, real-time video, movies, etc.) that can be captured by any of various types of image capture devices (still camera, digital camera, video camera, smartphone, etc.). The phrase "photo of interest" refers to any photograph of any object that is of interest to an occupant of a vehicle (driver and/or passenger). The word "vehicle" as used in this disclosure can pertain to any one of various types of vehicles such as, for example, cars, vans, sports utility vehicles, trucks, electric vehicles, gasoline vehicles, and hybrid vehicles. The described embodiments are applicable to various types of vehicles that are defined by the Society of Automotive Engineers (SAE) as incorporating six levels of driving automation ranging from Level 0 (fully manual) to Level 5 (fully autonomous). It must be understood that words such as "implementation," "application," "scenario," "case," and "situation" as used herein are an abbreviated version of the phrase "In an example ("implementation," "application," "scenario," "case," "approach," and "situation") in accordance with the disclosure." It must also be understood that the word "example" as used herein is intended to be non-exclusionary and non-limiting in nature.

FIG. 1 shows a vehicle 105 that includes a photography assistance system 125 in accordance with an embodiment of the disclosure. The photography assistance system 125 can include a processor 126 that is configured to execute computer-executable instructions stored in a memory 127 for performing various operations in accordance with the disclosure. Some example operations are described below.

The vehicle 105 may further include components such as, for example, a vehicle controller 145, an infotainment system 140, and various image capture devices (such as, for example, a camera 110, a camera 115, and a camera 120). These components may be communicatively coupled to each other and to the photography assistance system 125 (wirelessly and/or via wired connections).

The vehicle controller 145 may be operated to execute various operations related to the vehicle 105, such as, for example, controlling engine operations (fuel injection, speed control, emissions control, braking, etc.), managing climate controls (air conditioning, heating etc.), activating airbags, and issuing warnings (check engine light, bulb failure, low tire pressure, etc.), and also for executing various operations in accordance with disclosure.

In an example scenario, the vehicle 105 is a driver-operated vehicle and the vehicle controller 145 responds to actions performed by a driver 150 (such as, for example, reducing the speed of the vehicle 105 when the driver 150 executes a braking operation, moving the vehicle 105 at a cruising speed when the driver 150 applies cruise control, and selecting an appropriate gear when the driver 150 steps on the accelerator).

In another example scenario, the vehicle 105 is an autonomous vehicle and the vehicle controller 145 performs some or all of various operations that may replicate those performed by a human driver. In this example scenario, the vehicle controller 145 is also configured to perform various operations associated with providing photography assistance in accordance with the disclosure. Providing photography assistance may include, for example, autonomously configuring a camera to capture a photograph, and capturing the photograph (either autonomously or by following instructions provided by the driver 150).

The infotainment system 140 may include a combination of various entertainment items (such as a radio, streaming audio solutions, etc., and USB access ports for digital audio devices). The infotainment system 140 may also include other types of items, such as, for example, a navigation system and a graphical user interface (GUI). The driver 150 may use the GUI for interacting with the photography assistance system 125 and/or with the vehicle controller 145 for capturing a photograph of an object located outside the vehicle 105.

The cameras installed in the vehicle 105 can be any of various types of image capture devices such as, for example, a digital camera that captures a still image or a video camera that captures a video clip and/or real-time video. Each of the cameras may be mounted at any of various locations on the vehicle 105. In the illustrated implementation, the camera 110, the camera 115 and the camera 120 are mounted on an exterior portion of the vehicle 105 and configured to capture images of various objects located outside the vehicle 105. In another implementation, a camera may be mounted inside the vehicle 105 such as, for example, on a dashboard of the vehicle 105 and/or on a mounting plate behind a rear seat of the vehicle 105 and configured to capture images of various objects located outside the vehicle 105.

More particularly, in the illustrated example vehicle 105, the camera 110 is an image capture device that is mounted on the roof the vehicle 105 and provides a 360-degree field of view for capturing images of any object that is located anywhere around the outside of the vehicle 105. The captured images may be conveyed in accordance with the disclosure to the vehicle controller 145, the photography assistance system 125, the infotainment system 140, the mobile device 130, and/or the mobile device 160.

When the vehicle 105 is an autonomous vehicle, the camera 110 may be configured not only for providing images to the vehicle controller 145 to enable the vehicle controller 145 to autonomously control the movement of the vehicle 105 (navigation, collision avoidance, etc.) but also to operate under control of the photography assistance system 125 for capturing images in accordance with disclosure.

The camera 115 may be mounted upon a front portion of the vehicle 105 (for example, on a front bumper, behind a grille, on a license plate etc.) and configured for capturing photographs of objects located in front of the vehicle 105. The camera 120 may be mounted upon a real portion of the vehicle 105 (for example, on a rear bumper, on a trunk, on a license plate etc.) and configured for capturing photographs of objects located behind the vehicle 105.

The driver 150 may carry a mobile device 130, which can be any of various devices such as, for example, a smartphone, a tablet computer, or a wearable device (smartwatch, for example). The mobile device 130 can incorporate a camera and can also incorporate hardware and/or software that provide various functionalities at least some of which are substantially similar to those provided by the infotainment system 140. The various functionalities can include displaying the GUI that the driver 150 may use for obtaining assistance from the photography assistance system 125 when capturing a photograph of an object located outside the vehicle 105.

A passenger 155 who is seated in a rear seat of the vehicle 105 may carry a mobile device 160 (a smartphone, a tablet computer, or a wearable device, for example) that can be used for executing functions similar to those executed by the mobile device 130 carried by the driver 150.

In an example situation, the driver 150 may be interested in using the mobile device 130 to capture a photo of an object located outside the vehicle 105 but may be unprepared to do so and/or may be unaware of an upcoming opportunity to do so. The photography assistance system 125 provides guidance to assist the driver 150 capture such photos in accordance with the disclosure.

In one scenario, the guidance provided by the photography assistance system 125 may be a prompt on the mobile device 130 and/or the infotainment system 140 to warn the driver 150 of an upcoming location where the object is located. The photography assistance system 125 may also communicate with the driver 150 (and/or the vehicle controller 145) to allow the vehicle 105 to be slowed down when passing the location.

The driver 150 may then point the mobile device 130 out of the driver-side window and capture a photo of the object (if the object is on the driver side of the vehicle 105). The passenger 155 may point his/her mobile device 160 out of the rear passenger side window and capture a photo of the object (if the object is on the passenger side of the vehicle 105).

In another scenario, the photography assistance system 125 may recommend that the driver 150 pull over and stop at a specific location that permits the driver 150 to exit the vehicle 105 and capture a photo of the object.

It must be understood that various actions described herein with reference to the driver 150 (actions other than driving the vehicle 105) can be equally applicable to other occupants of the vehicle 105. Thus, for example, an action performed by the driver 150 upon his/her mobile device 130 to capture a photograph of an object of interest can be equally applicable to the passenger 155 capturing a photograph of the object of interest by use of his/her mobile device 160.

It must also be understood that various operations described herein with reference to the infotainment system 140 may be equally applicable to other devices, including the mobile device 130 carried by the driver 150 and/or the mobile device 160 carried by the passenger 155. Thus, for example, any description pertaining to displaying of an item upon a display screen of the infotainment system 140 is equally applicable to displaying the item upon the mobile device 130 and/or the mobile device 160.

Figure 2:
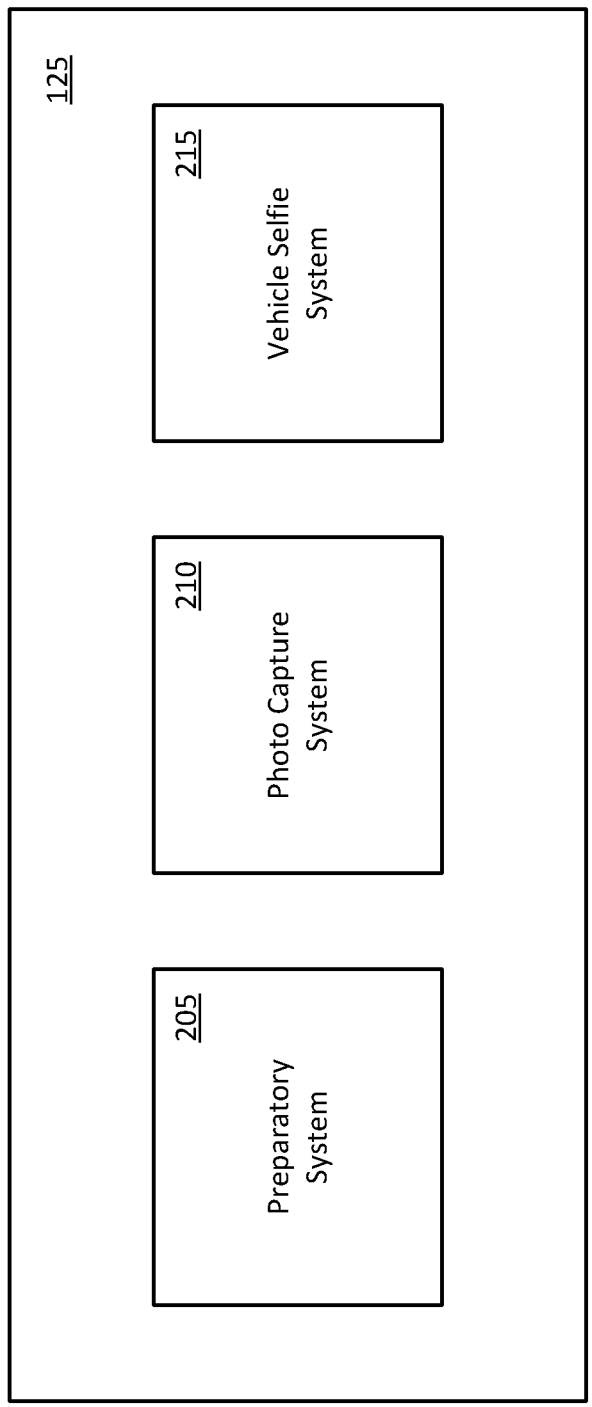
FIG. 2 shows example functional blocks that may be included in a photography assistance system in accordance with an embodiment of the disclosure.

FIG. 2 shows a few example functional blocks that may be included in the photography assistance system 125 in accordance with an embodiment of the disclosure. The example functional blocks include a preparatory system 205, a photo capture system 210, and a vehicle selfie system 215.

The preparatory system 205 may provide photography assistance to the driver 150 for capturing a photograph of an object of photographical interest to the driver 150 (and/or to the passenger 155). The object (man-made object, natural object, scenery. etc.) may be present along a travel route traversed by the vehicle 105. The photography assistance may be provided by obtaining information regarding the object from any of various sources and using the information to assist the driver 150 to capture a photograph of the object.

In a first example scenario, the preparatory system 205 may obtain the information from the driver 150 (via the GUI of the infotainment system 140 and/or via the mobile device 130) and/or from the passenger 155 (via his/her mobile device 160).

Obtaining the information may be carried out in various ways. In one scenario, the preparatory system 205 displays a query upon a display screen of the infotainment system 140 to enable the driver 150 to provide the information. The query may be provided in any of various forms such as, for example, in the form of a multiple-choice listing of objects (tourist spots, scenic overlooks, historical monuments, local attractions, etc.) and at any of various times (prior to heading out on a trip, enroute on a trip, etc.).

The query may be configured on the basis of information that may be particularly relevant to a travel route that the driver 150 intends to take. Thus, for example, the preparatory system 205 may obtain route information of a travel route from a navigation system that can be a part of the infotainment system 140 and/or the mobile device 130. The route information may be evaluated by the preparatory system 205 in order to identify objects that may be of interest to the driver 150 and to include the identified objects in the multiple-choice listing of objects displayed upon the display screen of the infotainment system 140.

In a second example scenario, information regarding one or more objects of photographical interest to the driver 150 (and/or the passenger 155) may be obtained by the preparatory system 205 from a cloud source (a cloud computer, a cloud storage device, etc.). In one case, information stored in the cloud source can be crowd-sourced information provided by various individuals who may have traveled on the same travel route over which the driver 150 intends to travel. The crowd-sourced information may be provided in any of various forms such as, for example, in the form of travel blogs, web pages, recommendations, comments, videos, and photographs.

In one implementation, photographs and/or videos obtained by the preparatory system 205 from the cloud source, may be displayed on the display screen of the infotainment system 140 (and/or the mobile device 130) so as to allow the driver 150 to preview and make decisions pertaining to capturing photographs of various objects.

The preparatory system 205 cooperates with the photo capture system 210 to allow the driver 150 to capture photos of the various objects. More particularly, the preparatory system 205 may provide to the photo capture system 210, information pertaining to an object of interest to the driver 150 (and/or the passenger 155).

In one case, the photo capture system 210 receives the information prior to the vehicle 105 reaching a spot where the object is located. The information can include, for example, GPS information for identifying the spot, road information in the vicinity of the spot (speed limit, parking facilities, one-lane or multi-lane, shoulder, exit, etc.), and object-related information (whether located on left side or right side of road, visibility from road, visibility from a look-out area, photos from cloud source, etc.).

The photo capture system 210 may use the information to generate and to display instructions, recommendations, guidance, and/or preview photos on a display screen of the infotainment system 140. In an example scenario, the photo capture system 210 may issue a prompt via the infotainment system 140 to warn the driver 150 of an upcoming location where the object of interest is located.

The photo capture system 210 may make a determination whether it is advisable for the driver 150 to stop the vehicle 105 at the location (if a stop is safe and permissible) or whether the driver 150 can capture the photograph while the vehicle 105 is in motion. In some cases, the photo capture system 210 may seek input from the driver 150 (via the infotainment system 140) to make the determination.

If the determination is made that it is advisable to stop at the location, the photo capture system 210 may provide audible or visual instructions to assist the driver 150 stop and park the vehicle 105 at a specific spot that provides a view of the object of interest. The driver 150 may stop and park the vehicle 105 at the recommended spot, exit the vehicle 105, and use his/her mobile device 130 to capture a photo of the object of interest. The passenger 155 may also exit the vehicle 105 to capture a photo of the object of interest.

If the driver 150 does not wish to exit the vehicle 105, the photo capture system 210 may provide audible or visual instructions to the driver 150 for stopping and parking the vehicle 105 with a specified orientation at a specific spot that provides a view of the object of interest. The specified orientation of the vehicle 105 may be determined by the photo capture system 210 on the basis of orienting a camera of the vehicle 105 (for example, the camera 115) to have a field of view of the object. The photo capture system 210 may communicate with the camera to compose the photograph (focus, zoom, frame size, etc.) and to capture the photograph of the object. A preview photo may be made available to the driver 150 on the display screen of the infotainment system 140 for obtaining approval of the driver 150 prior to the photo capture system 210 operating the camera (the camera 115, for example) for capturing a photo of the object.

If the determination is made that it is advisable to capture the photograph while the vehicle 105 is in motion, the photo capture system 210 may provide audible or visual instructions to assist the driver 150 drive past the location in a manner that is suitable for capturing a photograph of the object. For example, the photo capture system 210 may instruct the driver 150 to slow down at a first spot ahead of where the object is viewable, move into a lane that provides a view of the object, and set the travel speed of the vehicle 105 to an optimal speed that allows a certain amount of time to capture the photograph.

The driver 150 may follow the instructions and upon reaching the spot at which the object is viewable, point the mobile device 130 out of the driver-side window to capture a photo of the object (if the object is on the driver side of the vehicle 105). In some cases, the photo capture system 210 and/or the driver 150 may instruct the passenger 155 to point his/her mobile device 160 out of the rear passenger side window and capture a photo of the object (if the object is on the passenger side of the vehicle 105).

In another example implementation, the photo capture system 210 displays upon the infotainment system 140, a real-time image or a real-time video clip of the object as the vehicle 105 travels past the spot from which the object is viewable. Various techniques (such as, for example, image processing techniques and artificial intelligence techniques) may be employed to configure the displayed image or video clip for viewing by the driver 150 in a manner that allows the driver 150 to decide when, how, and where to capture a photo of the object.

The real-time image (for example, a photo pre-view that includes the object and surroundings) or the real-time video clip, may be generated by a camera of the vehicle 105 such as, for example, the camera 110 mounted on the roof the vehicle 105. The driver 150 can observe the real-time image or real-time video clip and activate a photo capture icon on the display screen of the infotainment system 140 for capturing a photo of the object in accordance with his/her preference (angle, view, zoom, pan, crop, surrounding features, etc.).

Upon activating the photo capture icon, a camera, such as, for example, the camera 110, captures a photograph of the object. The captured photo may be displayed on the display screen of the infotainment system 140 for approval by the driver 150. If the driver 150 is unsatisfied, another photo may be captured.

In one implementation, the camera may execute a burst mode of operation to capture a set of photographs. The set of photographs may then be displayed on the display screen of the infotainment system 140. The driver 150 may opt to examine and save one or more of the photographs displayed on the display screen of the infotainment system 140. The burst mode of operation may not only address problems associated with defocused photographs (as a result of the movement of the vehicle 105) but may also offer various views and angles of the photographed object.

In another example scenario, the driver 150 may desire to capture a photo of an object with the vehicle 105 included in the photograph. The vehicle selfie system 215 may be operated to execute this operation. As a part of this operation, the vehicle selfie system 215 may communicate with the preparatory system 205 and with the photo capture system 210 to obtain information that can be used to assist the driver park the vehicle 105 at a certain orientation, exit the vehicle 105, place a camera upon a tripod at a spot recommended by the vehicle selfie system 215, stand near the vehicle 105, and remotely control the camera (via the mobile device 130 or a handheld wireless controller, for example) for capturing a photograph of the object with the vehicle 105 included in the photograph. Additional details pertaining to this photo capture procedure are provided below.

Figure 3:
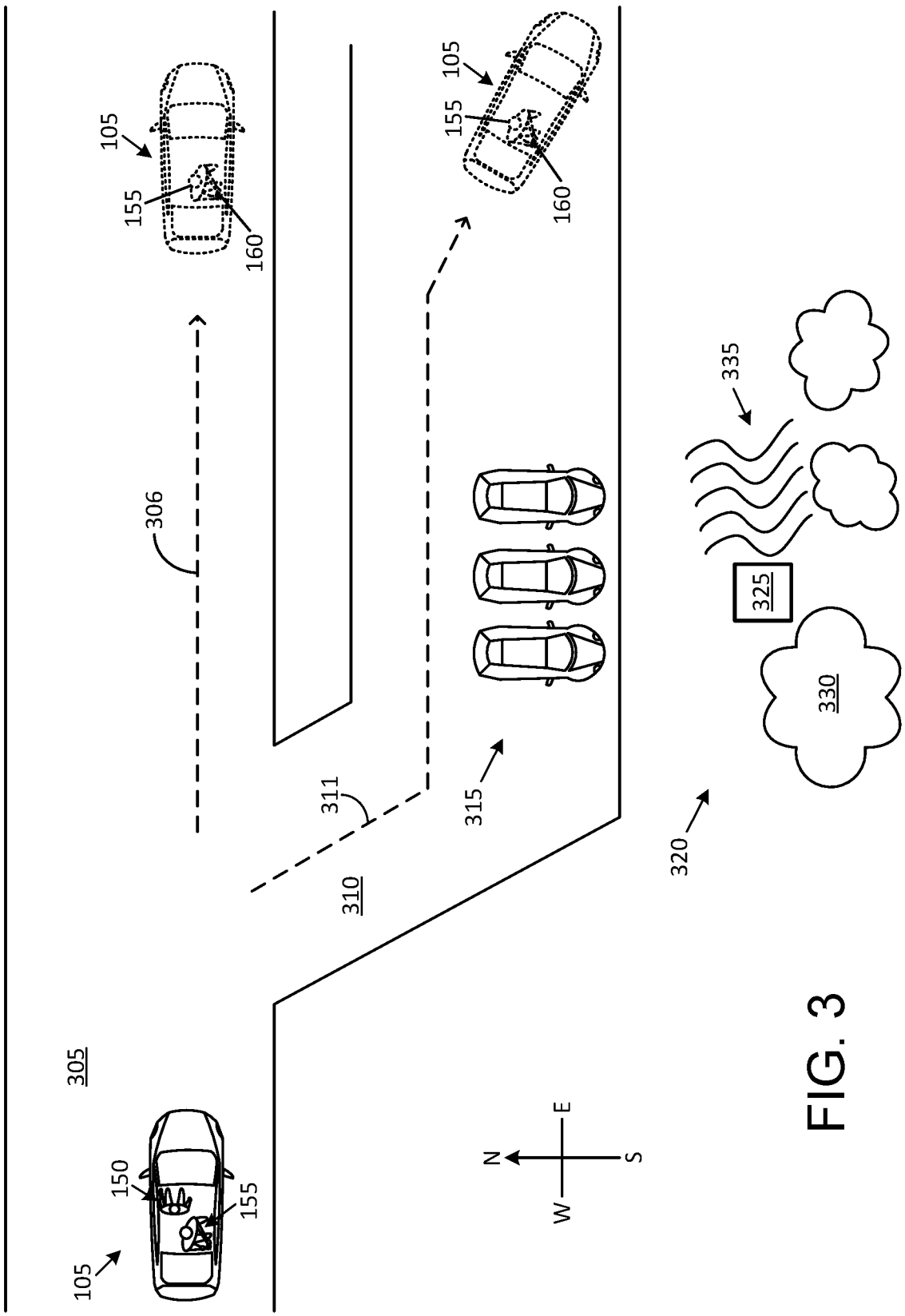
FIG. 3 illustrates a first example scenario where a vehicle is operative as a photography assistant in accordance with an embodiment of the disclosure.

FIG. 3 illustrates a first example scenario where the vehicle 105 is operative as a photography assistant in accordance with an embodiment of the disclosure. The vehicle 105 can be a driver-operated vehicle in one case and an autonomous vehicle in another. It must be understood that various actions described below with reference to the driver 150 (in the case where the vehicle 105 is a driver-operated vehicle) may be equally applicable to the vehicle controller 145 (in the case where the vehicle 105 is an autonomous vehicle).

Some of the actions described below with reference to the driver 150 may also be performed by automation provided in the vehicle 105. For example, an auto-park system provided in the vehicle 105 may execute a parking operation under guidance of the photography assistance system 125. The parking operation can involve parking the vehicle 105 at an angle that is specified by the photography assistance system 125.

In the illustrated example scenario, the vehicle 105, which includes the driver 150 and the passenger 155, is traveling east on a road 305. The road 305 includes an exit into a side road 310 that leads to a look-out area that provides a view of an object 320 of photographic interest to the driver 150 and/or the passenger 155. The object 320 may also be viewable from a spot further east on the road 305, after the vehicle 105 has passed the exit into the side road 310.

It must be understood that the term "object 320" as used henceforth, can refer to a single object (an object 325, for example) or to a collection of objects. The collection of objects may include a man-made object (the object 325, for example), a natural object (a tree 330 a stream 335, for example), and scenery (forest scenery, for example).

In a first scenario, the photography assistance system 125 determines a current location of the vehicle 105 (west of the exit, on the road 305) by obtaining GPS information from a navigation system that can be a part of the infotainment system 140. The photography assistance system 125 may display, on the display screen of the infotainment system 140, a prompt to alert the driver 150 of the object 320 ahead and may also display information pertaining to the object 320 (a preview photograph obtained from a cloud source, for example). The photography assistance system 125 may also display a query to inquire whether the driver 150 is interested in capturing a photograph of the object 320.

In one case, the driver 150 may evaluate the displayed information and decide against capturing a photo of the object 320. In this case, the photography assistance system 125 may stop providing assistance associated with capturing a photograph of the object 320.

In another case, the driver 150 may express an interest in capturing a photograph of the object 320. In this case, the photography assistance system 125 may evaluate information obtained via the preparatory system 205 as described above, and make a determination whether the photograph can be captured while the vehicle 105 is in motion or whether photo capture necessitates that the vehicle 105 be in a stopped condition.

If the photograph can be captured while the vehicle 105 is in motion, the photography assistance system 125 identifies a spot that provides an unobstructed view of the object 320 as the vehicle 105 continues traveling on the road 305. In the illustrated example scenario, a spot that provides the unobstructed view of the object 320 is located east of the exit. The photography assistance system 125 may then determine that the driver 150, who is seated on the left side in the cabin of the vehicle 105, does not have an unobstructed view of the object 320 and that the photograph may be better captured by the passenger 155 seated in the rear passenger seat on the right side in the cabin of the vehicle 105. In this case, the photography assistance system 125 instructs the driver 150 to travel along the path 306 (which may be a right-most slow lane of the road 305) and issues guidance to assist the passenger 155 use the mobile device 160 for capturing a photograph of the object 320 when the vehicle reaches the spot east of the exit (as illustrated by a dashed line outline of the vehicle 105 and the passenger 155).

If the photography assistance system 125 makes a determination that photo capture necessitates that the vehicle 105 be in a stopped condition (or the driver 150 provides an indication of preference for capturing the photo after stopping the vehicle 105), the photography assistance system 125 may instruct the driver 150 to exit the road 305 and travel along the path 311 on the side road 310.

The photography assistance system 125 may then evaluate images provided by the camera 115 and make a determination that a number of vehicles are already parked in a set of parking slots 315. The photography assistance system 125 may instruct the driver 150 to park the vehicle 105 at a vacant spot located beyond the set of parking slots 315 (illustrated by a dashed line outline of the vehicle 105 and the passenger 155). The vacant spot provides an unobstructed view of the object 320.

The photography assistance system 125 may further instruct the driver 150 to orient the vehicle 105 at a specific angle when parked. The specific angle of orientation allows the passenger 155 to capture a photograph of the object 320 without getting out of the vehicle 105 and/or allows the photography assistance system 125 to operate a camera (the camera 110, for example) for capturing a photograph of the object 320.

In another scenario, the driver 150 (and/or the passenger 155) may provide an indication that he/she prefers to get out of the vehicle 105 for capturing a photograph of the object 320. In this scenario, the photography assistance system 125 may desist from providing parking assistance and allow the driver 150 to park the vehicle 105 at any suitable spot. The spot chosen by the driver 150 may, or may not, provide an unobstructed view of the object 320. The driver 150 and/or the passenger 155 may exit the vehicle 105 for capturing a photograph of the object 320 from any spot.

Figure 4:
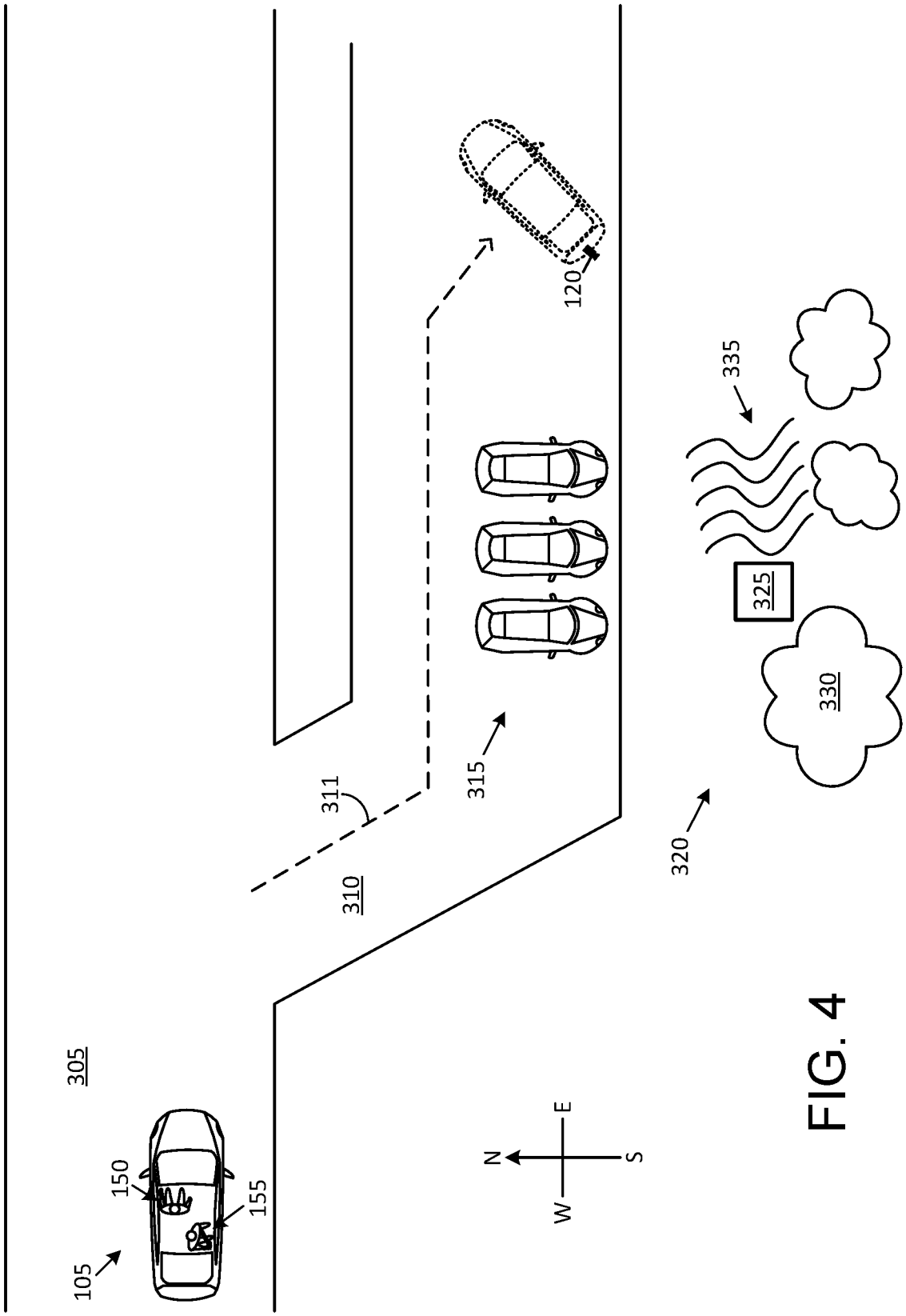
FIG. 4 illustrates a second example scenario where a vehicle is operative as a photography assistant in accordance with an embodiment of the disclosure.

FIG. 4 illustrates a second example scenario where the vehicle 105 is operative as a photography assistant in accordance with an embodiment of the disclosure. In the first example scenario described above (illustrated in FIG. 3), the photography assistance system 125 instructs the driver 150 to orient the vehicle 105 at a specific angle when parked so as to allow the photography assistance system 125 to operate the camera 110 for capturing a photograph of the object 320. In the second example scenario illustrated in FIG. 4, the photography assistance system 125 instructs the driver 150 to orient the vehicle 105 at a different angle when parked, so as to allow the photography assistance system 125 to operate the camera 120 for capturing a photograph of the object 320. The orientation of the vehicle 105 may, for example, allow the driver 150 to get back on to the road 305 without spending too much time in capturing the photograph of the object 320.

Figure 5:
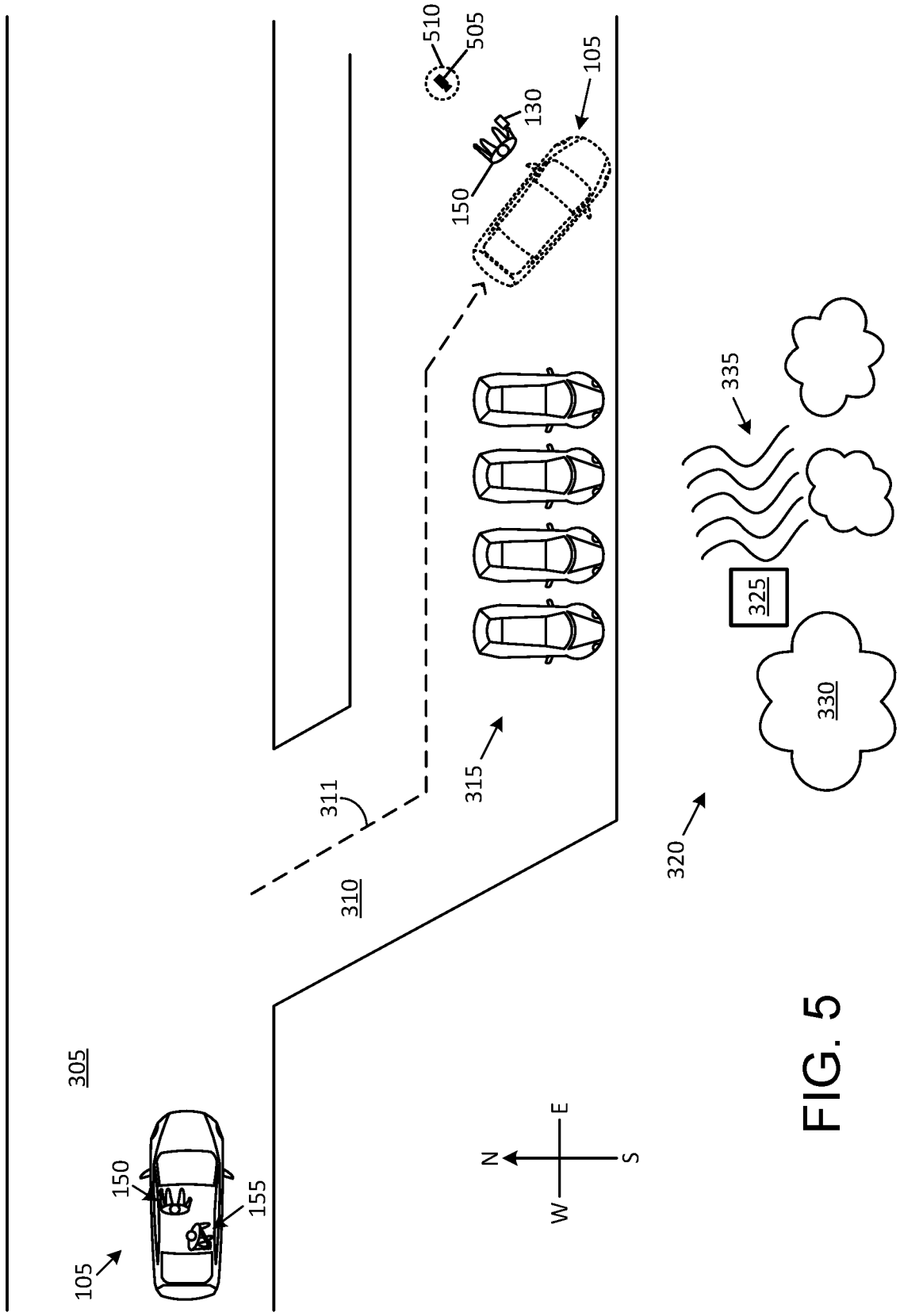
FIG. 5 illustrates a third example scenario where a vehicle is operative as a photography assistant in accordance with an embodiment of the disclosure.

FIG. 5 illustrates a third example scenario where the vehicle 105 is operative as a photography assistant in accordance with an embodiment of the disclosure. In this scenario, the photography assistance system 125 executes a selfie-mode photo capture operation for capturing a selfie photograph that includes the vehicle 105 in a photograph of the object 320. The selfie-mode photo capture operation may involve the photography assistance system 125 executing actions such as identifying a parking spot for the vehicle 105, identifying an angular orientation of the vehicle 105 when parked, capturing the selfie photograph, and providing instructions to the driver 150 for capturing a selfie photograph.

Providing instructions to the driver 150 for capturing the selfie photograph can include identifying a parking spot for the vehicle 105, and instructing the driver 150 to park at the identified parking spot with the vehicle 105 oriented at a specific angle. The photography assistance system 125 may then instruct the driver 150 to exit the vehicle 105 and place a camera 505 upon a tripod at a location 510 specified by the photography assistance system 125.

The location 510, which may be determined by the photography assistance system 125, can be based on obtaining a field of view that encompasses the vehicle 105, the object 320, and the driver 150 (when standing in front of, or besides, the vehicle 105).

In an example implementation, the photography assistance system 125 may provide the instructions to the driver 150 by use of audible and/or visual notifications issued through the infotainment system 140, audible and/or visual notifications issued through the mobile device 130 carried by the driver 150, and/or by illuminating the location 510. Illuminating the location 510 may be carried out by use of a laser pointer device (not shown) provided in the vehicle 105.

In some scenarios, the photography assistance system 125 may evaluate the placement of the camera 505 and modify the placement for various reasons. Modifying the placement may involve issuing instructions to the driver 150 to move the tripod on which the camera 505 is mounted to a different spot so as to obtain a better field of view, and/or to avoid certain objects such as, for example, other people who may be accidentally standing in the field of view of the camera 505.

In a first example scenario, after ascertaining a satisfactory placement of the camera 505, the photography assistance system 125 may activate the camera 505 for capturing the selfie photo. Activating the camera 505 can include the use of wireless communications (Bluetooth®, Ultra-Wideband, Wi-Fi, Zigbee®, infrared, etc.) between the photography assistance system 125 and the camera 505.

In a second example scenario, after ascertaining a satisfactory placement of the camera 505, the photography assistance system 125 may inform the driver 150 that the camera 505 is ready for operation. The driver 150 may activate the camera 505 for capturing the selfie photo by use of a handheld remote-control device or by use of the mobile device 130 (configured to execute remote control operations upon the camera 505).

The driver 150 may opt to upload the selfie photograph to a cloud device for various purposes such as, for example, to share with other people and/or for purposes of creating a video travel blog. The video travel blog can be used for various purposes including for purposes of advertisement of the vehicle 105 (promoting sales of a certain type, model, and make of vehicle, for example).

In another example implementation, the driver 150 (or the passenger 155) may launch an unmanned aerial vehicle (not shown) configured for capturing photographs. The unmanned aerial vehicle may then be operated in lieu of the camera 505 for capturing the selfie photograph from various angles and/or for capturing other photographs (a close-up photograph of the object 325, for example) in accordance with the disclosure.

Figure 6:
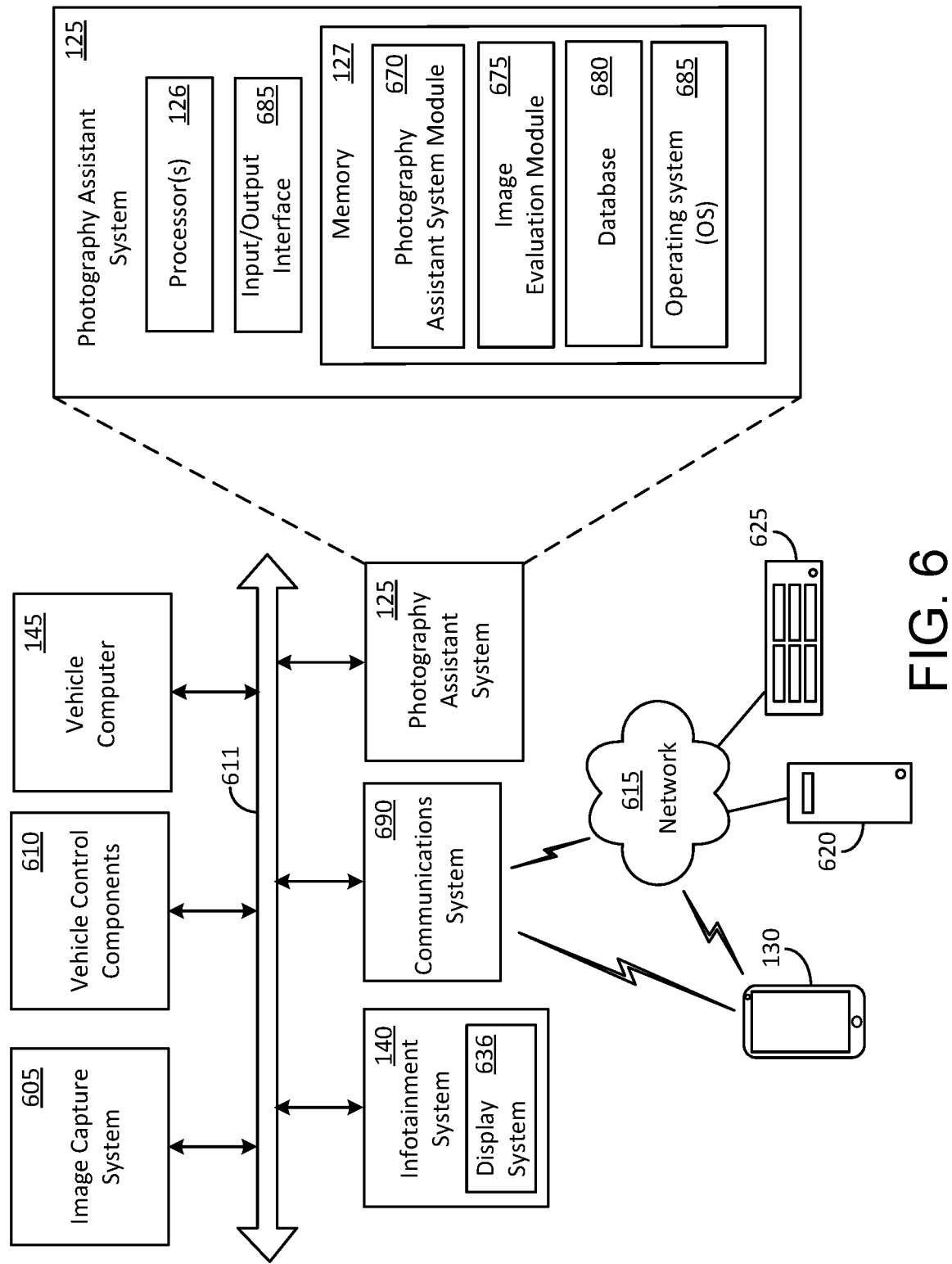
FIG. 6 shows some functional components that may be included in a vehicle that includes a photography assistance system in accordance with an embodiment of the disclosure.

FIG. 6 shows some example components that can be included in the vehicle 105 in accordance with an embodiment of the disclosure. The example components can include an image capture system 605, vehicle control components 610, the vehicle controller 145, the infotainment system 140, a communications system 690, and the photography assistance system 125. The various components are communicatively coupled to each other via one or more buses such as an example bus 611. The bus 611 may be implemented using various wired and/or wireless technologies. For example, the bus 611 can be a vehicle bus that uses a controller area network (CAN) bus protocol, a Media Oriented Systems Transport (MOST) bus protocol, and/or a CAN flexible data (CAN-FD) bus protocol. Some or all portions of the bus 611 may also be implemented using wireless technologies such as Bluetooth®, Ultra-Wideband, Wi-Fi, Zigbee®, or near-field-communications (NFC).

The infotainment system 140 can include a display system 636 having a GUI for carrying out various operations. The GUI may be used, for example, by the driver 150 to interact with the photography assistance system 125 and for performing actions associated with capturing photographs (previewing a photograph, framing a photograph, activating a camera of the image capture system 605, editing a photograph, etc.).

The image capture system 605 can include various types of cameras such as, for example, the camera 110, the camera 115, and the camera 120 that are shown in FIG. 1.

The vehicle control components 610 can include various components and systems associated with driving functions of the vehicle 105 (such as, for example, the engine, brakes, accelerator, and fuel injection) and various other functions such as controlling the cameras provided in the vehicle 105.

The communications system 690 an include various components such as, for example, a wireless transmitter, a wireless receiver, and/or a wireless transceiver, that are configured to allow the photography assistance system 125 to communicate with devices such as, for example, the mobile device 130, a cloud computer 620, and a cloud storage device 625. The communications may be carried out via wireless signals either directly, or via a network 615, using any of various communication formats such as, for example, Bluetooth®, Ultra-Wideband, Wi-Fi, Ultra-Wideband (UBW), Zigbee®, and near-field-communications (NFC).

The network 615 may include any one, or a combination of networks, such as a local area network (LAN), a wide area network (WAN), a telephone network, a cellular network, a cable network, a wireless network, and/or private/public networks such as the Internet. At least one portion of the network 615 includes a wireless communication link (a WiFi link, for example), that allows the photography assistance system 125, the vehicle controller 145, and/or the infotainment system 140 to communicate with the cloud computer 620. The network 615 may also support a wireless communication link (a cellular link, for example) that supports communications between the cloud computer 620, the mobile device 130 carried by the driver 150, and the mobile device 160 carried by the passenger 155.

In one implementation, the photography assistance system 125 can be an independent device (enclosed in an enclosure, for example). In another implementation, some or all components of the photography assistance system 125 can be housed, merged, or can share functionality, with the vehicle controller 145. For example, an integrated unit that combines the functionality of the photography assistance system 125 with that of the vehicle controller 145 can be operated by a single processor and a single memory device. In the illustrated example configuration, the photography assistance system 125 includes the processor 126, an input/output interface 685, and the memory 127.

The input/output interface 685 is configured to provide communications between the photography assistance system 125 and other components such as the image capture system 605 (for receiving images from the cameras, for example).

The memory 127, which is one example of a non-transitory computer-readable medium, may be used to store an operating system (OS) 685, a database 680, and various code modules such as a photography assistance system module 670 and an image evaluation module 675. The code modules are provided in the form of computer-executable instructions that can be executed by the processor 126 for performing various operations in accordance with the disclosure.

The database 680 may be used to store information such as, for example, images captured by use of the image capture system 605 and images obtained from the cloud computer 620 and/or cloud storage device 625.

The photography assistance system module 670 may be executed by the processor 126 for performing various operations in accordance with the disclosure including, for example, the various operations described above.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 127, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    generating, by a processor of a photography assistance system in a vehicle, a guidance associated with a photo capture operation;
    conveying, by the processor, the guidance to a vehicle controller and/or an occupant of the vehicle;
    providing, by the processor, assistance in execution of a vehicle maneuvering operation to capture a photograph of an object of photographical interest located outside the vehicle,
    wherein the vehicle maneuvering operation is executed by one of the vehicle controller or a driver of the vehicle, and wherein the photo capture operation comprises:

determining, by the processor, that the object of photographical interest located outside the vehicle is in a field of view of a camera mounted on the vehicle;

displaying, by the processor, upon a display screen of an infotainment system in the vehicle and/or a mobile device carried by the occupant of the vehicle, an image of the object of photographical interest;

detecting, by the processor, an action performed by the occupant of the vehicle on the infotainment system or the mobile device in response to displaying of the image of the object of photographical interest;

configuring, by the processor, the camera to capture the photograph of the object of photographical interest in accordance with the action performed by the occupant of the vehicle; and operating, by the processor, the camera to capture the photograph of the object of photographical interest.

2. The method of claim 1, wherein the vehicle is an autonomous vehicle and the vehicle maneuvering operation is executed autonomously by the vehicle controller, and further wherein the photo capture operation is executed by the occupant of the vehicle and/or autonomously by the processor of the photography assistance system.

3. The method of claim 1, wherein the vehicle maneuvering operation involves one of parking the vehicle at a location that provides a view of the object of photographical interest located outside the vehicle or slowing down the vehicle while driving past the location that provides the view of the object of photographical interest.

4. The method of claim 3, wherein parking the vehicle at the location involves parking the vehicle in an orientation that enables photo capture of the object of photographical interest located outside the vehicle.

5. The method of claim 1, wherein the vehicle maneuvering operation is executed by a driver of the vehicle, and wherein the photo capture operation is executed by at least one of the photography assistance system, the driver, or a passenger in the vehicle.

6. The method of claim 1, wherein the vehicle maneuvering operation is executed by one of the vehicle controller or a driver of the vehicle, and wherein the photo capture operation comprises:

determining, by the processor, that the object of photographical interest located outside the vehicle is in a field of view of a camera mounted on the vehicle;

configuring, by the processor, the camera to capture the photograph of the object of photographical interest; and operating, by the processor, the camera to capture the photograph of the object of photographical interest.

7. A method comprising:

obtaining, by a processor of a photography assistant system in a vehicle, information associated with an object of photographical interest that is located on a travel route of the vehicle;

issuing, by the processor, to a driver of the vehicle, a recommendation to capture a photograph of the object of photographical interest; and executing, by the driver, a vehicle maneuvering operation to capture the photograph of the object of photographical interest.

8. The method of claim 7, wherein executing the vehicle maneuvering operation involves one of parking the vehicle at a first location that provides a view of the object of photographical interest or slowing down the vehicle while driving past the first location that provides the view of the object of photographical interest.

9. The method of claim 8, wherein slowing down the vehicle while driving past the first location comprises:

determining, by the processor, a speed of travel of the vehicle that enables photo capture of the object of photographical interest; and issuing, by the processor, to the driver, a driving instruction to drive the vehicle past the first location at the speed of travel that enables photo capture of the object of photographical interest.

10. The method of claim 8, wherein parking the vehicle at the first location comprises:

determining, by the processor, an orientation of the vehicle that enables photo capture of the object of photographical interest; and issuing, by the processor, to the driver, a parking instruction to park the vehicle in the orientation that enables photo capture of the object of photographical interest.

11. The method of claim 10, further comprising:

detecting, by the processor, parking of the vehicle in the orientation that enables photo capture of the object of photographical interest;

issuing, by the processor, a first instruction to the driver to exit the vehicle;

issuing, by the processor, a second instruction to the driver to stand at a second location;

determining, by the processor, that the driver and the object of photographical interest are included in a field of view of a camera mounted on the vehicle; and operating, by the processor, the camera to capture a photograph of the driver and the object of photographical interest.

12. The method of claim 10, further comprising:

detecting, by the processor, parking of the vehicle in the orientation that enables photo capture of the object of photographical interest;

issuing, by the processor, a first instruction to the driver to exit the vehicle;

issuing, by the processor, a second instruction to the driver to stand at a second location;

determining, by the processor, that the driver, the vehicle, and the object of photographical interest are included in a field of view of a camera that is placed outside the vehicle; and operating, by the driver, the camera to capture a photograph of the driver, the vehicle, and the object of photographical interest.

13. The method of claim 12, wherein operating, by the driver, the camera to capture the photograph of the driver, the vehicle, and the object of photographical interest comprises:

using a wireless controller to control the camera that is placed outside the vehicle.

* * * * *